(12) United States Patent
Tempel et al.

(10) Patent No.: US 11,258,053 B2
(45) Date of Patent: Feb. 22, 2022

(54) LITHIUM ION SOLID-STATE BATTERY AND METHOD FOR PRODUCING THE SAME

(71) Applicant: FORSCHUNGSZENTRUM JUELICH GMBH, Juelich (DE)

(72) Inventors: Hermann Tempel, Kreuzau (DE); Shicheng Yu, Juelich (DE); Hans Kungl, Heidelberg (DE); Xin Gao, Shanghai (CN); Roland Schierholz, Cologne (DE); Andreas Mertens, Cologne (DE); Joseph Mertens, Alsdorf (DE); Lambertus G. J. De Haart, Aachen (DE); Ruediger-A. Eichel, Juelich (DE)

(73) Assignee: FORSCHUNGSZENTRUM JUELICH GMBH, Juelich (DE)

( * ) Notice: Subject to any disclaimer, the term of this patent is extended or adjusted under 35 U.S.C. 154(b) by 236 days.

(21) Appl. No.: 16/462,248

(22) PCT Filed: Nov. 18, 2017

(86) PCT No.: PCT/DE2017/000391
§ 371 (c)(1),
(2) Date: May 20, 2019

(87) PCT Pub. No.: WO2018/113807
PCT Pub. Date: Jun. 28, 2018

(65) Prior Publication Data
US 2019/0341597 A1    Nov. 7, 2019

(30) Foreign Application Priority Data

Dec. 21, 2016 (DE) .................. 10 2016 015 191.9

(51) Int. Cl.
*H01M 4/04* (2006.01)
*H01M 10/0525* (2010.01)
(Continued)

(52) U.S. Cl.
CPC ......... *H01M 4/0471* (2013.01); *H01M 4/043* (2013.01); *H01M 10/0525* (2013.01); *H01M 50/46* (2021.01)

(58) Field of Classification Search
CPC ..... H01M 10/0562; H01M 2300/0065; H01M 4/043; H01M 4/0471
See application file for complete search history.

(56) References Cited

U.S. PATENT DOCUMENTS 9,419,308 B2    8/2016  Sano
2009/0214957 A1*  8/2009  Okada ............... H01M 10/0562
                                                              429/319

(Continued)

FOREIGN PATENT DOCUMENTS

CN    106876668 A    6/2017
DE    102011121236 A1  6/2013

(Continued)

OTHER PUBLICATIONS

Yuki Kato, et al., "High-power all-solid-state batteries using sulfide superionic conductors", nature energy, vol. 1, article 16030, Mar. 21, 2016, pp. 1-7.

*Primary Examiner* — Christopher P Domone
(74) *Attorney, Agent, or Firm* — Leydig, Voit & Mayer, Ltd.

(57) ABSTRACT

A method for preparing a lithium ion solid-state accumulator comprising an anode, a cathode, and a solid-state electrolyte includes pressing and sintering pre-calcined electrolyte powder to an electrolyte layer. The pre-calcined electrolyte powder comprises at least one phosphate compound, at least one silicide compound, or at least one phosphorus sulfide. The method further includes applying, on both sides of the electrolyte layer, one electrode each. Prior to the application of the at least one electrode layer on a surface of the sintered electrolyte layer, first, at least one intermediate layer, and, (Continued)

then, on this intermediate layer, the electrode layer is applied. The at least one intermediate layer is a layer of electrolyte and anode material and/or a layer of electrolyte and cathode material.

16 Claims, 3 Drawing Sheets

(51) Int. Cl.
*H01M 2/16* (2006.01)
*H01M 50/46* (2021.01)

(56) References Cited

U.S. PATENT DOCUMENTS

| | | | |
|---|---|---|---|
| 2010/0216032 A1* | 8/2010 | Baba | B29C 65/02 |
| | | | 429/322 |
| 2014/0011100 A1 | 1/2014 | Lee et al. | |
| 2014/0084503 A1* | 3/2014 | Badding | C04B 35/62665 |
| | | | 264/6 |
| 2014/0349197 A1 | 11/2014 | Schlim et al. | |
| 2015/0333366 A1* | 11/2015 | Sato | H01M 10/0525 |
| | | | 429/319 |
| 2016/0181657 A1 | 6/2016 | Kawaji et al. | |
| 2016/0268629 A1 | 9/2016 | Tanaka et al. | |

FOREIGN PATENT DOCUMENTS

| | | |
|---|---|---|
| EP | 2096693 A1 | 9/2009 |
| EP | 2315298 A1 | 4/2011 |
| JP | 2001126758 A | 5/2001 |
| JP | 2010225390 A | 10/2010 |
| JP | 2015028854 A | 2/2015 |
| JP | 5715003 B2 | 5/2015 |

\* cited by examiner

LITHIUM ION SOLID-STATE BATTERY AND METHOD FOR PRODUCING THE SAME

CROSS REFERENCE TO RELATED APPLICATIONS

This application is a U.S. National Stage Application under 35 U.S.C. § 371 of International Application No. PCT/DE2017/000391 filed on Nov. 18, 2017, and claims benefit to German Patent Application No. DE 10 2016 015 191.9 filed on Dec. 21, 2016. The International Application was published in German on Jun. 28, 2018 as WO 2018/113807 A1 under PCT Article 21(2).

FIELD

The invention relates to the field of battery technology—particularly, lithium-ion solid-state batteries or accumulators, and, in particular, to their production methods.

BACKGROUND

Rechargeable lithium-ion batteries, also referred to below as Li-ion accumulators, have been on the rise in recent years. In particular, solid-state batteries or solid-state electrolyte batteries are of great interest. This applies equally to the corresponding accumulators. Here, an ion-conducting solid is used instead of the normally liquid or polymer-stabilized (gel) electrolyte. This solid-state electrolyte is generally designed to be inorganic (ceramics, glasses, etc.).

Decisive for the functionality of a solid electrolyte are the low electronic conductivity at simultaneously high ionic conductivity and a sufficiently high electrochemical stability with respect to the anode and cathode material. The high conductivity for ions advantageously minimizes the internal electrical resistance of the accumulator and results in a high power density, while at the same time the high electrical resistance minimizes the self-discharge rate of the accumulator and thereby extends its lifespan or storage suitability.

Rechargeable solid-state batteries (accumulators) have hitherto, however, generally had a low power density in comparison with accumulators with liquid electrolytes. However, they ensure safe and environmentally friendly operation, since no liquids can escape from the cell. The problems potentially occurring with liquid electrolytes such as leakage, overheating, burn-off, and toxicity can thus, advantageously, be overcome. As a rule, this feature also leads to a particularly long lifespan.

In most solid state, electrolyte rechargeable, lithium-air accumulators, a positive electrode comprising lithium and porous graphite or amorphous silicon as a negative electrode are used. Ceramics or glasses permeable to lithium ions or glass ceramic composites are used as solid electrolyte.

Between the solid electrolyte and the electrodes are often layers, comprising a polymer-ceramic composite material, that, on the one hand, improve the charge transfer to the anode and, on the other, connect the cathode to the solid electrolyte. In addition, they regularly reduce the resistance.

The previously well-functioning lithium-ion accumulators generally have a thin-film electrolyte. The task of the electrolyte is to conduct lithium ions from the anode to the cathode during discharge and to simultaneously electrically insulate the two poles. Solid-state materials suitable for this purpose have voids in their atomic lattice structure. Lithium ions can occupy these and thus move from void to void through the solid state. However, this mechanism is somewhat slower than the diffusion processes within a liquid electrolyte. In this way, the ion transport resistance is somewhat increased compared to a liquid electrolyte. This disadvantage can, however, in principle be compensated for by the design of the electrolyte as a thin layer. The disadvantage is that the capacity of such thin-film accumulators is only poorly scalable due to their limited layer thickness.

From Kato et al., "High-power all-solid-state batteries using sulfide supertonic conductors," nature energy, DOI: 10.1038/nenergy.2016.30, for example, a lithium-ion accumulator is known in which $Li_{9.54}Si_{1.74}P_{1.44}S_{11.7}Cl_{0.3}$ is used as a solid electrolyte.

The electrochemical stability window hitherto known—usually oxide-ceramic, but also sulfide solid-state electrolytes—is about 2 V, and thus below the voltages of more than 3.5 V generally used for lithium-ion accumulators.

The commercial production of thin-film accumulators regularly requires very complex processing techniques, such as physical vapor deposition (PVD), for example. For this purpose, however, the encapsulation of these cells must be perfect, since small amounts of impurities already lead to a breakdown in the function of these accumulators.

Furthermore, functionalization and adaptation of the solid interfaces involved in pure gas phase processes proves to be difficult.

For example, a lithium-based, commercial, solid-state, thin film cell is marketed by the company, "Infinite Power Solutions," under the name, "Thinergy® MEC200."

Each component of the cell is produced by a complex gas phase process. In this way, it is, however, possible to realize thin electrodes only, which in turn severely impairs the total capacity of the cell.

In this context, layer thicknesses between, typically, 10 and 50 μm are regarded as thin layers.

SUMMARY

In an embodiment, the present invention provides a method for preparing a lithium ion solid-state accumulator comprising an anode, a cathode, and a solid-state electrolyte. The method includes pressing and sintering pre-calcined electrolyte powder to an electrolyte layer. The pre-calcined electrolyte powder comprises at least one phosphate compound, at least one silicide compound, or at least one phosphorus sulfide. The method further includes applying, on both sides of the electrolyte layer, one electrode each. Prior to the application of the at least one electrode layer on a surface of the sintered electrolyte layer, first, at least one intermediate layer, and, then, on this intermediate layer, the electrode layer is applied. The at least one intermediate layer is a layer of electrolyte and anode material and/or a layer of electrolyte and cathode material.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
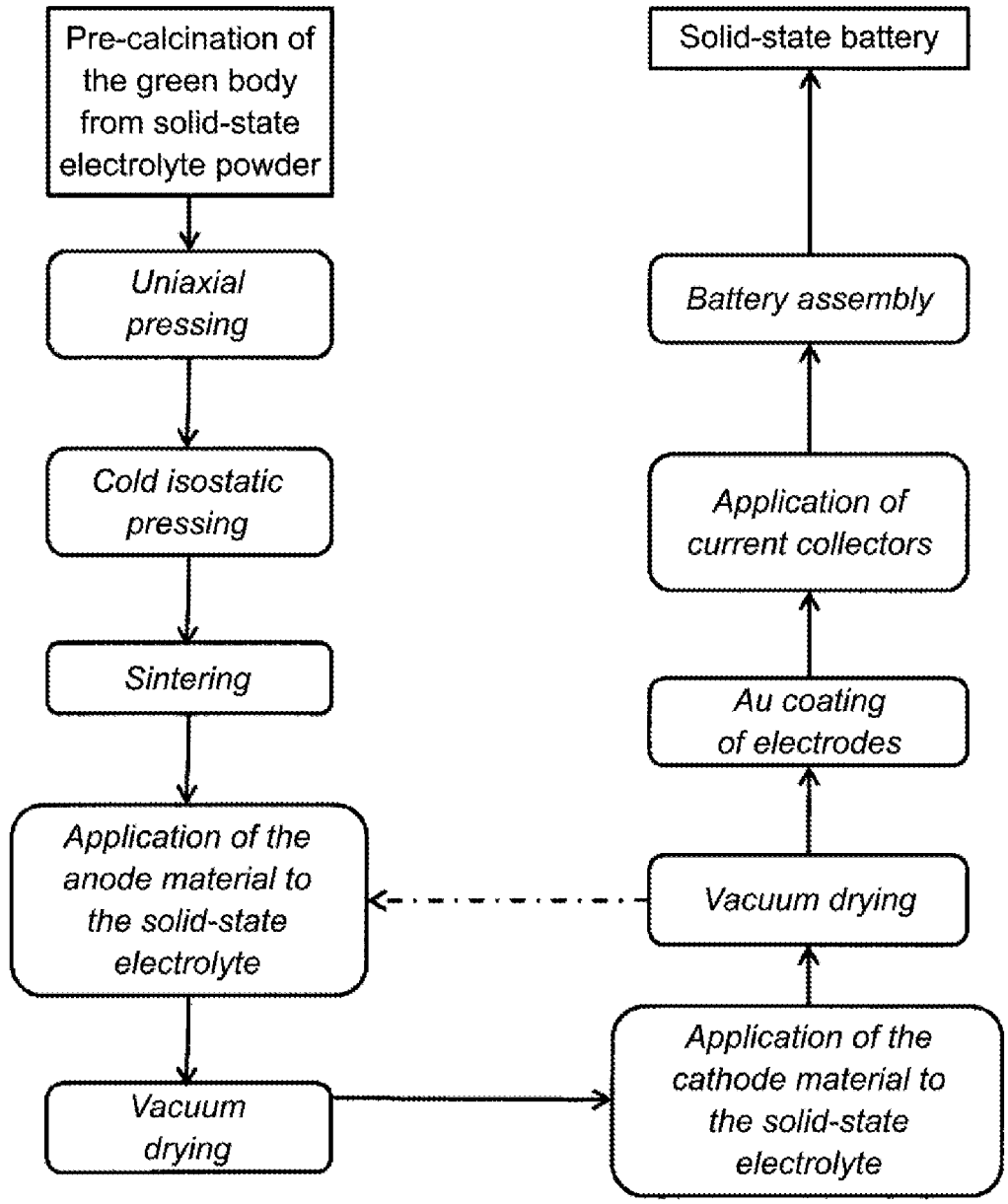
FIG. 1 is a flowchart of an advantageous embodiment of the electrolyte-based method according to an embodiment of the invention for preparing a solid-state battery.
Figure 2:
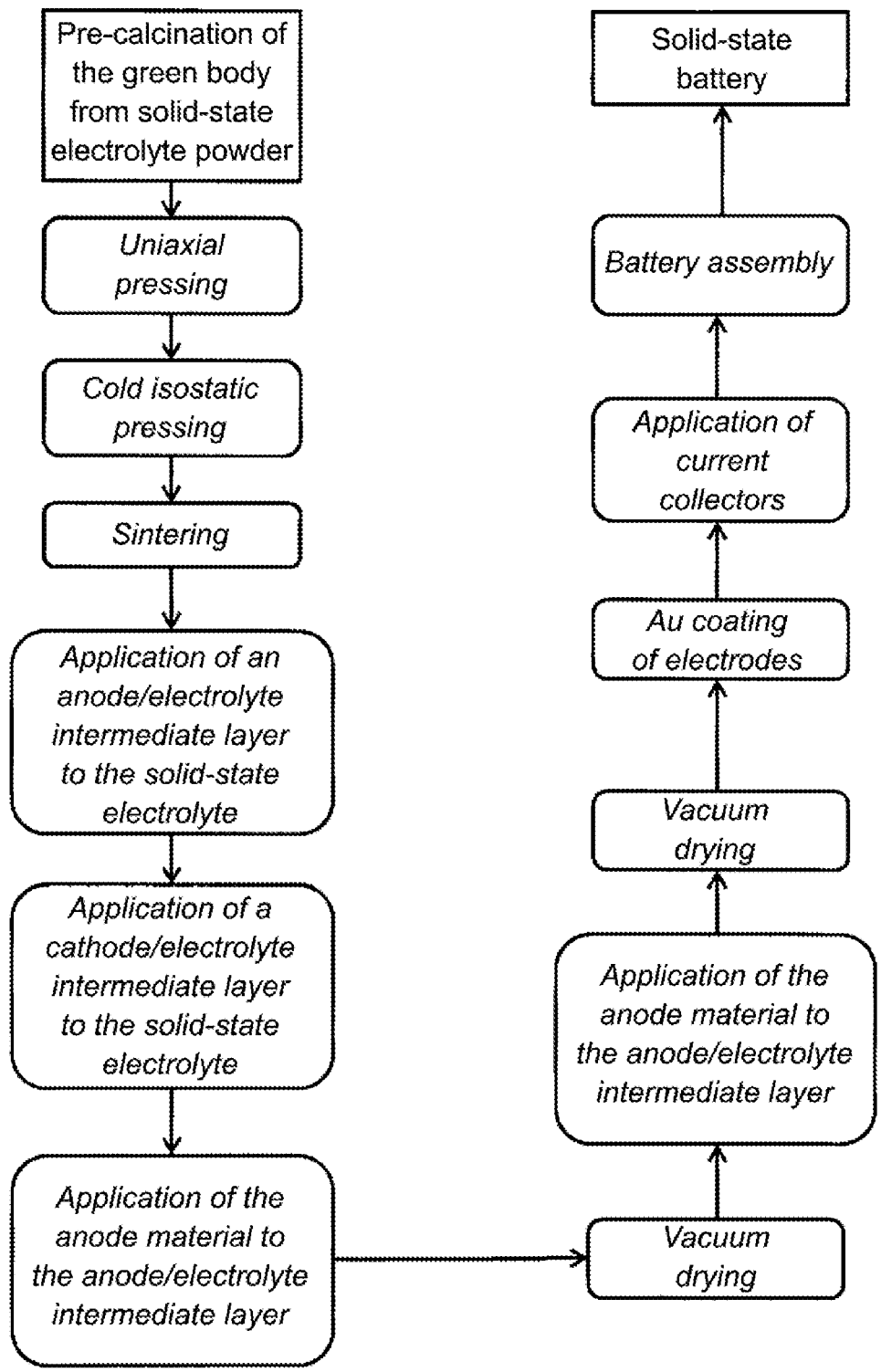
FIG. 2 is a flowchart of an electrolyte-based method according to an embodiment of the invention for preparing a solid-state battery having intermediate layers.
Figure 3A:
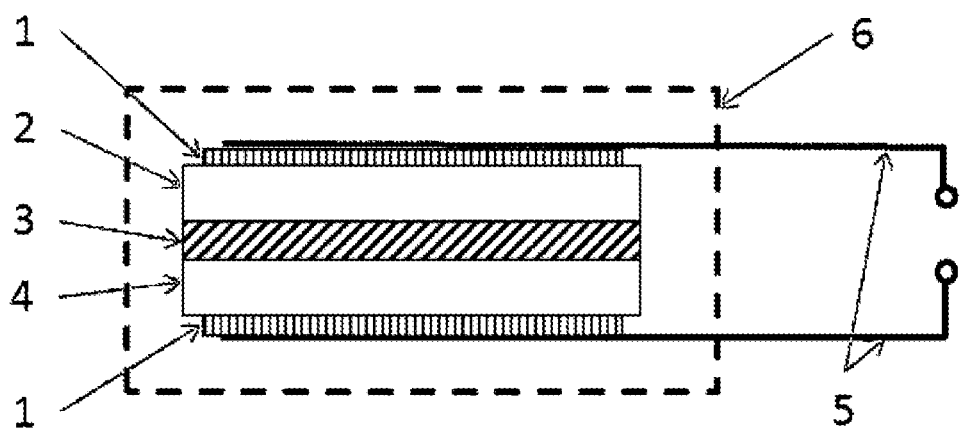
FIGS. 3a and 3b illustrate, schematically, a structure of solid-state accumulators according to embodiments of the invention, without (FIG. 3a) and with (FIG. 3b) optional intermediate layers having current collectors (1), an anode (2), a solid-state electrolyte (3) according to an embodiment of the invention, a cathode (4), an electrical contact (5), and an accumulator housing (6). Additionally shown in FIG. 3b is an anodic intermediate layer (7) and cathodic intermediate layer (8).
Figure 3B:
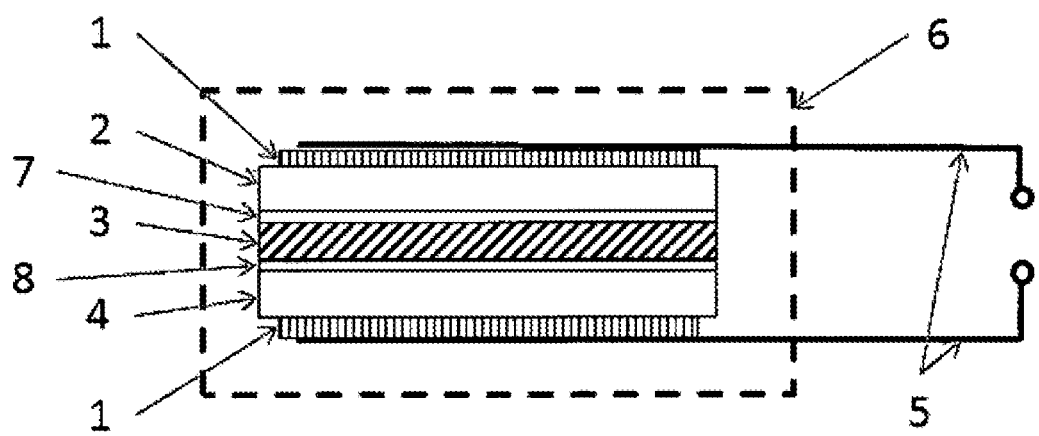

It has been found that, due to the use of different anions in the individual cell components, the contacts at the interfaces between the solid electrodes and the solid electrolyte are often not optimally designed, since the volume expansion of intercalation materials depends upon the respective anion structure of the materials.

Furthermore, the different expansions during charging and discharging of solid-state accumulators often results, disadvantageously, in the loss of contact between the electrode layers.

Embodiments of the invention provide effective and economical lithium-ion solid-state accumulators which overcome certain disadvantages known from the prior art.

Further embodiments of the invention provide simple and cost-effective methods for producing such solid-state accumulators, and in particular, lithium-ion solid-state accumulators.

Within the scope of the invention, it has been found that the production of a solid-state accumulator, and, particularly, the production of a lithium-ion solid-state accumulator, can advantageously be based upon a solid electrolyte, and not upon one of the electrode sides. The solid-state electrolyte thus assumes the mechanical load-bearing role in the production of the electrochemical cell.

This means that the construction of the solid-state accumulator produced according to embodiments of the invention takes place on the electrolyte side, i.e., beginning with the production of an almost densely sintered electrolyte, on which, subsequently, the two electrodes can be arranged on the both sides.

In the following, the term "accumulator" is used for rechargeable batteries.

According to the invention, it is provided that, first corresponding powder material be pressed into a dense electrolyte layer and then sintered. An electrolyte is then present as an almost densely sintered electrolyte. "Almost densely" is to be understood as meaning that the electrolyte has a density greater than 85% of the theoretical density. At the same time, the electrolyte should have a porosity of not more than 20 vol %—preferably, not more than 15 vol %. In order to have the necessary mechanical stability, the electrolyte layer according to the invention has a layer thickness of at least 100 µm.

An electrolyte according to the invention can thereby be prepared both via liquid phase synthesis (sol gel or hydrothermal) and via a so-called solid oxide synthesis. In the solid oxide synthesis, the oxidic precursors are ground thoroughly, and subsequently calcined. The electrolyte is then pre-pressed uniaxially in the form of an electrolyte pellet at greater than 10 kN, and then isostatically compressed at greater than 1,200 kN and sintered.

Electrolyte powders suitable for this purpose comprise, on the one hand, compounds such as oxides, phosphates or even silicates, but, on the other, also phosphorus sulfides. These compounds or phosphorus sulfides, individually, as well as mixtures of various such compounds or phosphorus sulfides, can be used.

Some specific compounds which are suitable as electrolyte powders in the above sense are listed below by way of example, without being limited to these:

Oxides such as $Li_{7-x}La_3Zr_2Al_xO_{12}$, where x=0 to 0.5, or $Li_7La_3Zr_{2-x}Ta_xO_{12}$, where x=0 to 0.5, Lithium aluminum titanium phosphates, such as $Li_{1+x}M_xTi_{2-x}(PO_4)_3$, where x=0 to 7 and M=Al (LATP), Fe, Y, or Ge, Lithium lanthanum zirconate, wherein dopings of tantalum, aluminum, and iron can additionally be used, Lithium phosphorus sulfides, wherein germanium and selenium can be doped, such as $Li_7P_3S_{11}$, $Li_{10}P_3S_{12}$, $Li_{10}M_xP_{3-x}S_{12}$, where M=Ge, Se and x=0 to 1, where $M=A_yB_z$, wherein A=Si, Ge and B=Sn, Si, and where y=0 to 0.5 and z=1-y.

In a preferred embodiment of the invention, a mixture of different phosphate compounds is preferably used in the method according to the invention.

A particularly advantageous powder mixture for the preparation of the solid electrolyte according to the invention comprises, for example, lithium vanadium phosphate (LVP), lithium aluminum titanium phosphate (LATP), and lithium titanium phosphate (LTP). Since it represents the actual ion-conducting electrolyte material, LATP is present in excess and is generally also added to both the anode and the cathode in order to achieve better conductivities.

The ratio of LVP to LTP in this preferred electrolyte powder is 1.2:1, for example. It is a cathodically-limited cell in which the cathode has more lithium as the active component than the anode can take up.

The powder for the production of the solid-state electrolyte should have an average particle size between 100 nm and 800 nm—preferably, between 200 nm and 650 nm—in order to allow a density of at least 85% of the theoretical density after compacting and sintering.

A bimodal or broad distribution of the grain sizes of the electrolyte powder used over the aforementioned relevant range has proven to be advantageous and promising for achieving high theoretical densities. Too-low densities are less conducive to a solid-state electrolyte, since the factor limiting ionic conduction is the grain boundary conductivity.

The mean grain size ($d_{50}$) of the powder used was determined, on the one hand, by means of a scanning electron microscope (SEM) and, on the other, also by the method of measuring the static light scattering.

By a suitable selection of the powder compounds or mixtures of these compounds for the electrolyte, it is, advantageously, possible to exploit the stability window of the electrolyte or to adapt the overall structure of the accumulator as best as possible to the electrolyte.

As a specific example of this, the combination LTP and LVP can be mentioned, which exploits the electrochemical stability window of the electrolyte in a particular way. In this case, however, a relatively low cell voltage occurs as a disadvantage, since the voltage of the anode (LTP) against $Li/Li^+$ is 2.5 V, and thus the high voltage of the cathode cannot be used regularly to achieve high energy densities.

The solid-state electrolyte prepared in this way preferably has, after a sintering step, a layer thickness between 100 µm and 800 µm—preferably, between 200 µm and 500 µm and, particularly advantageously, between 200 µm and 300 µm.

Layer thicknesses of greater than 500 µm can already lead to a limitation of the internal resistance of the cell. The lower limit of 100 µm regularly indicates the lower limit at which the layer can be present in its function as a mechanically-stable carrier.

In a further step, individual electrode layers can be applied directly on both sides to the previously-sintered electrolyte layer. Screen printing is to be mentioned, in particular, as a suitable method for this purpose. In general, all printing methods, such as offset, roll-to-roll, dipping bed, or ink jet printing are suitable for the system.

All standard electrode materials can thereby be used, wherein the electrode material used should align itself with the stability window of the electrolyte.

Examples of suitable oxidic electrode materials for the cathode are:

$LiNiCoAlO_2$, $LiNiCoMnO_2$ (NMC), $LiMn_{2-x}M_xO_4$, where M=Ni, Fe, Co, or Ru and where x=0 to 0.5, and $LiCoO_2$ (LCO).

The following materials are, for example, suitable as an anode:

$V_2O_5$, $LiVO_3$, $Li_3VO_4$, and $Li_4Ti_5O_{12}$ (LTP).

Compounds comprising phosphates are also suitable as electrode materials, such as $Li_3V_2(PO_4)_3$ or $LiMPO_4$, where M=¼ (Fe, Co, Ni, Mn), for a cathode, or $LiM_2(PO_4)_3$, where M=Zr, Ti, Hf, or a mixture of the same, for an anode.

As a particular feature, accumulators prepared according to embodiments of the invention have the uniform structure of the polyanions $(PO_4)^{3-}$ across anode, electrolyte, and cathode. This structural feature also occurs when phosphates, phosphorus sulfides, and silicates are used.

The stability of the solid-state accumulators prepared according to embodiments of the invention is achieved, in particular, by compounds that match structurally, i.e., in their molecular structure. The structural integrity of the system is ensured by an electrode and electrolyte combination, which are matched in their crystal structure and volume expansion.

An advantageous embodiment of the invention provides that at least one interface between an electrode and the previously prepared solid electrolyte be, in addition, adapted to a particular degree by a micro- and/or nanostructuring.

In order, for example, to achieve even better structural adaptation of both electrodes to the electrolyte, composite layers of electrolyte and anode material or electrolyte and cathode material can be optionally used as "adhesion-promoting" layers. In these layers, in addition to the pure electrolyte material, nanostructured anode or cathode particles are also included as active components.

The intermediate layers are generally applied to the solid-state electrolyte with layer thicknesses of between 1 and 10 µm and, particularly, between 1 and 5 µm. Subsequently, the corresponding electrode layers are applied.

The nanostructuring can be achieved, for example, by the use of solvothermal synthesis with the addition of suitable surfactants, e.g., Triton X100®. As a result, a compensation of the intrinsic roughness and a good connection of the materials of both layers to each other can be ensured.

The processing of all further layers of the solid-state accumulator, i.e., the electrode layers and the optional intermediate layers, can, advantageously, be done with standard printing processes, such as screen printing, offset printing, or inkjet.

An exemplary embodiment of a preparation of a solid-state electrolyte according to an embodiment of the invention and coating thereof are described herein below.

Pre-calcined lithium aluminum titanium phosphate (LATP) powder is compacted after milling in a ball mill (mean grain size after milling, $d_{50}<1$ µm) in a uniaxial piston press into a pellet of 11 mm diameter (40 kN).

Subsequently, the pellet is polished on the surface and sintered at 1,100° C. (heating rate 2 K/min), holding time for 30 h in the powder bed. The sintered electrolyte pellet has a density of about 90% of the theoretical density and a thickness of about 400 µm. In the process, the diameter shrinks only minimally to about 11.5 mm.

To prepare the pastes for the electrodes, LVP (for a cathode) or LTP (for an anode), and LATP, carbon powder (Super-P®), and ethyl cellulose are stirred together in a mortar and then mixed with NMP (1-methyl-pyrrolidone) in a ratio of 9:5:3:3 (wt %) in a tumble mixer for 30 min. These pastes are printed by screen printing with wet layer thicknesses of 70 µm per layer in layers onto the electrolyte pellets. Between the coatings, the pellet is dried overnight in the vacuum at 110° C.

The dried anode layer has a layer thickness of 60 µm (corresponds to three coatings) for balancing the capacitances, and the cathode layer has a thickness of 90 µm (corresponds to five coatings). The accumulator is subsequently measured in a battery housing under a contact pressure of about 1 t.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for preparing a lithium ion solid-state accumulator comprising an anode, a cathode, and a solid-state electrolyte, the method comprising:
pressing and sintering pre-calcined electrolyte powder to form a sintered electrolyte layer, wherein the pre-calcined electrolyte powder comprises at least one phosphate compound, at least one silicide compound, or at least one phosphorus sulfide;
applying, on a first side of the sintered electrolyte layer, a first intermediate layer, the intermediate layer comprising both electrolyte material and anode active material;

applying, on the first intermediate layer, an anode electrode layer, the anode electrode layer comprising the anode active material;

applying, on a second side of the sintered electrolyte layer, a second intermediate layer, the second intermediate layer comprising both electrolyte material and cathode active material; and applying, on the second intermediate layer, a cathode electrode layer, the cathode layer comprising the cathode active material wherein the at least one second intermediate layer is a layer of electrolyte and cathode material, wherein the electrolyte powder comprises a mixture of lithium vanadium phosphate and lithium aluminum titanium phosphate.

2. The method according to claim 1, wherein the pre-calcined electrolyte powder, which is pressed and sintered to form the sintered electrolyte layer, has a mean grain size between 100 and 800 nm.

3. The method according to claim 2, wherein each of the applying the first intermediate layer, the applying the anode electrode layer, the applying the second intermediate layer, and the applying the cathode electrode layer is performed by printing.

4. The method according to claim 1, wherein the electrolyte layer has a layer thickness between 100 µm and 800 µm.

5. The method according to claim 1, wherein at least one of the first intermediate layer and the second intermediate layer has a layer thickness between 1 and 10 µm.

6. The method according to claim 1, further comprising:
forming, on the anode electrode layer, a first current collector; and
forming, on the cathode electrode layer, a second current collector.

7. The method according to claim 2, wherein the electrolyte powder has a bimodal grain size distribution with a mean grain size of each mode in a range of 100 to 800 nm.

8. The method according to claim 2, wherein the electrolyte powder has a mean grain size between 200 and 650 nm.

9. The method according to claim 8, wherein the electrolyte powder has a bimodal grain size distribution with a mean grain size of each mode in a range of 200 to 650 nm.

10. The method according to claim 1 wherein the electrolyte powder further comprises lithium titanium phosphate, and wherein a ratio of lithium vanadium phosphate to lithium titanium phosphate is 1.2:1.

11. The method according to claim 1, wherein, after the pressing and sintering, the sintered solid-state electrolyte layer has a density of greater than 85% of the theoretical density or a porosity of less than 20 vol %.

12. The method according to claim 3, wherein the printing is screen printing, offset printing, roll-to-roll printing, dipping bed printing, and/or inkjet printing.

13. A lithium ion solid-state accumulator, comprising:
an anode comprising an anode active electrode material layer and a first current collector,
a cathode comprising a cathode active electrode material layer and a second current collector, and
a sintered solid-state electrolyte layer having a layer thickness between 100 µm and 800 µm, the sintered solid-state electrolyte layer comprising an electrolyte material,
a first intermediate layer arranged between the sintered solid-state electrolyte layer and the anode, wherein the first intermediate layer comprises the electrolyte material and anode active electrode material; and
a second intermediate layer arranged between the sintered solid-state electrolyte layer and the cathode, wherein the second intermediate layer comprises the electrolyte material and cathode active electrode material,
wherein, prior to sintering, the solid-state electrolyte layer is a pre-calcined electrolyte powder, and
wherein the electrolyte powder comprises a mixture of lithium vanadium phosphate and lithium aluminum titanium phosphate.

14. The lithium ion solid-state accumulator according to claim 13, wherein the sintered solid-state electrolyte layer has a density of greater than 85% of the theoretical density or a porosity of less than 20 vol %.

15. The lithium ion solid-state accumulator according to claim 13, wherein the electrolyte powder further comprises lithium titanium phosphate, and wherein a ratio of lithium vanadium phosphate to lithium titanium phosphate is 1.2:1.

16. The lithium ion solid-state accumulator according to claim 13, wherein the solid-state electrolyte comprises a pre-calcined electrolyte powder with a mean grain size between 100 and 800 nm.

* * * * *